United States Patent [19]

Buma

[11] Patent Number: 4,616,811
[45] Date of Patent: Oct. 14, 1986

[54] AIR SUSPENSION
[75] Inventor: Shuuichi Buma, Toyota, Japan
[73] Assignee: Toyota Jidosha Kabushiki Kaisha, Toyota, Japan
[21] Appl. No.: 709,661
[22] Filed: Mar. 8, 1985
[30] Foreign Application Priority Data Jul. 12, 1984 [JP] Japan .......................... 59-104457[U]

[51] Int. Cl.$^4$ .............................................. F16F 3/08
[52] U.S. Cl. ..................................... 267/35; 280/712; 280/714; 267/8 R; 267/64.24; 267/64.25
[58] Field of Search ...................... 267/8 R, 35, 64.11, 267/64.15, 64.25, 64.24, 122; 280/712, 714; 251/143

[56] References Cited

U.S. PATENT DOCUMENTS

| | | | |
|---|---|---|---|
| 3,046,000 | 7/1962 | Polhemus et al. | 267/35 |
| 4,164,274 | 8/1979 | Schupner | 188/287 X |
| 4,234,172 | 11/1980 | Takahashi | 267/35 X |
| 4,502,673 | 3/1985 | Clark | 267/64.24 |
| 4,534,580 | 8/1985 | Kobayashi et al. | 267/64.25 X |

FOREIGN PATENT DOCUMENTS

| | | |
|---|---|---|
| 3233160 | 9/1982 | Fed. Rep. of Germany . |
| 3447750 | 12/1984 | Fed. Rep. of Germany . |
| 3446152 | 12/1984 | Fed. Rep. of Germany . |
| 3444577 | 12/1984 | Fed. Rep. of Germany . |
| 1447677 | 6/1966 | France ............................. 267/64.24 |

Primary Examiner—George E. A. Halvosa
Attorney, Agent, or Firm—Oblon, Fisher, Spivak, McClelland & Maier

[57] ABSTRACT

An air suspension has the spring constant varied by controlling communication between a main air chamber and an auxiliary air chamber. The air suspension comprises a peripheral wall member defining a wall portion of the auxiliary air chamber and having a plurality of first and paths extending radially to open to the auxiliary air chamber, a tubular rubber member disposed inside the peripheral wall member and having a plurality of second air paths extending radially to communicate to the first air paths, a valve container disposed inside the rubber member and having a valve containing section, a plurality of third air paths extending from the valve containing section to an outer peripheral surface, and a fourth annular air path provided on the outer peripheral surface and communicating to the second and third air paths respectively, and a valve body disposed in the valve containing section of the valve container and having a fifth air path communicating to the main air chamber, and a plurality of sixth air paths extending from the fifth air path to an outer peripheral surface and being able to communicate to the third air paths. The number of the second air paths is smaller than that of the third air paths.

10 Claims, 3 Drawing Figures

AIR SUSPENSION

BACKGROUND OF THE INVENTION

1. Field of the Invention:

This invention relates to an air suspension for a vehicle provided with an air spring, and more particularly to an air suspension capable of varying the spring constant.

2. Description of the Prior Art:

An air suspension capable of varying the spring constant can be varied the spring constant by controlling communication between a main air chamber and an auxiliary air chamber provided in association with a shock absorber including a cylinder, a piston and a piston rod.

A valve unit for controlling the communication between both air chambers is generally provided in association with an elastic assembly for supporting elastically the piston rod on a car body. That is, a valve container permitting the penetration of an end of the piston rod and receiving a valve body is disposed in said elastic assembly and is fixedly attached to an inner tube of said elastic assembly. Said valve body is provided with a path communicating to the main air chamber, and said valve container is formed with at least a larger diameter path and a smaller diameter path capable of communicating to said path of the valve body. Also, air paths communicating to the auxiliary air chamber through said elastic assembly consisting of the inner tube, a tubular elastic member and an outer tube are provided respectively corresponding to the larger and smaller diameter paths of said valve container.

In said air suspension can be interrupted the communication between both air chambers by operating said valve body to the closing position and thereby the spring constant of the air suspension can be enlarged. Also, by operating said path of said valve body to align with the larger diameter path of the valve container can be reduced said spring constant. Further, by operating said path of said valve body to align with the smaller diameter path the valve container can be set said spring constant at an intermediate value.

In said prior art air suspension, since a plurality of air paths corresponding respectively to a plurality of paths provided in said valve container need to be formed in said elastic assembly, a plurality of penetration holes extending radially are formed in said tubular elastic member for forming the air paths. Since various forces such as shearing and compression forces acting between the car body and said piston rod act on the tubular elastic member, the number of said penetration holes is desirably as small as possible to improve the durability of said elastic member.

SUMMARY OF THE INVENTION

Accordingly, an object of the present invention is to improve the durability of an elastic member for elastically supporting a piston rod of a shock absorber on a vehicle body and forming at least an air path for interconnecting main air auxiliary air chambers.

The present invention relates to an air suspension which can vary the spring constant by controlling the communication between the main air auxiliary air chambers provided in association with the shock absorber including a cylinder, a piston and a piston rod. The air suspension comprises a peripheral wall member defining a wall portion of one of said both air chambers and having one or a plurality of first air paths penetrating from an inner peripheral surface to an outer peripheral surface to open to the air chamber, a tubular elastic member disposed inside said peripheral wall member and having one or a plurality of second air paths penetrating from an inner peripheral surface to an outer peripheral surface to communicate to said first air paths, a valve container having a valve containing section disposed inside said tubular elastic member and coupled to said piston rod, one or a plurality of third air paths penetrating from said valve containing section to an outer peripheral surface, and a fourth air path provided circumferentially on the outer peripheral surface and communicating to said second and third air paths respectively, and a valve body disposed in said valve containing section of said valve container and having a fifth air path communicating to the other one of said two air chambers and one or a plurality of sixth air paths penetrating from said fifth air path to an outer peripheral surface and being able to communicate to said third air path.

In a preferred embodiment, there are provided an outer tube and an inner tube. The outer tube is disposed between the peripheral wall member and the tubular elastic member, and the inner tube between the elastic member and the valve container.

Either one of said peripheral wall member or said outer tube and either one of said valve container or said inner tube have air path respectively which extend circumferentially, preferably each of the air paths being an annular.

In the air suspension according to the present invention, the circumferential air path is provided to afford communication between the air path of the elastic member and that of the valve container, so that the number of air paths of the elastic member does not need to be equal to that of the valve container.

Accordingly, the number of said air paths provided in said elastic member can be reduced, resulting in the improvement on the durability of the elastic member.

The other objects and features of the present invention will become apparent from the following description of preferred embodiments of the invention with reference to the accompanying drawings.

DESCRIPTION OF THE PREFERRED EMBODIMENTS

Figure 1:
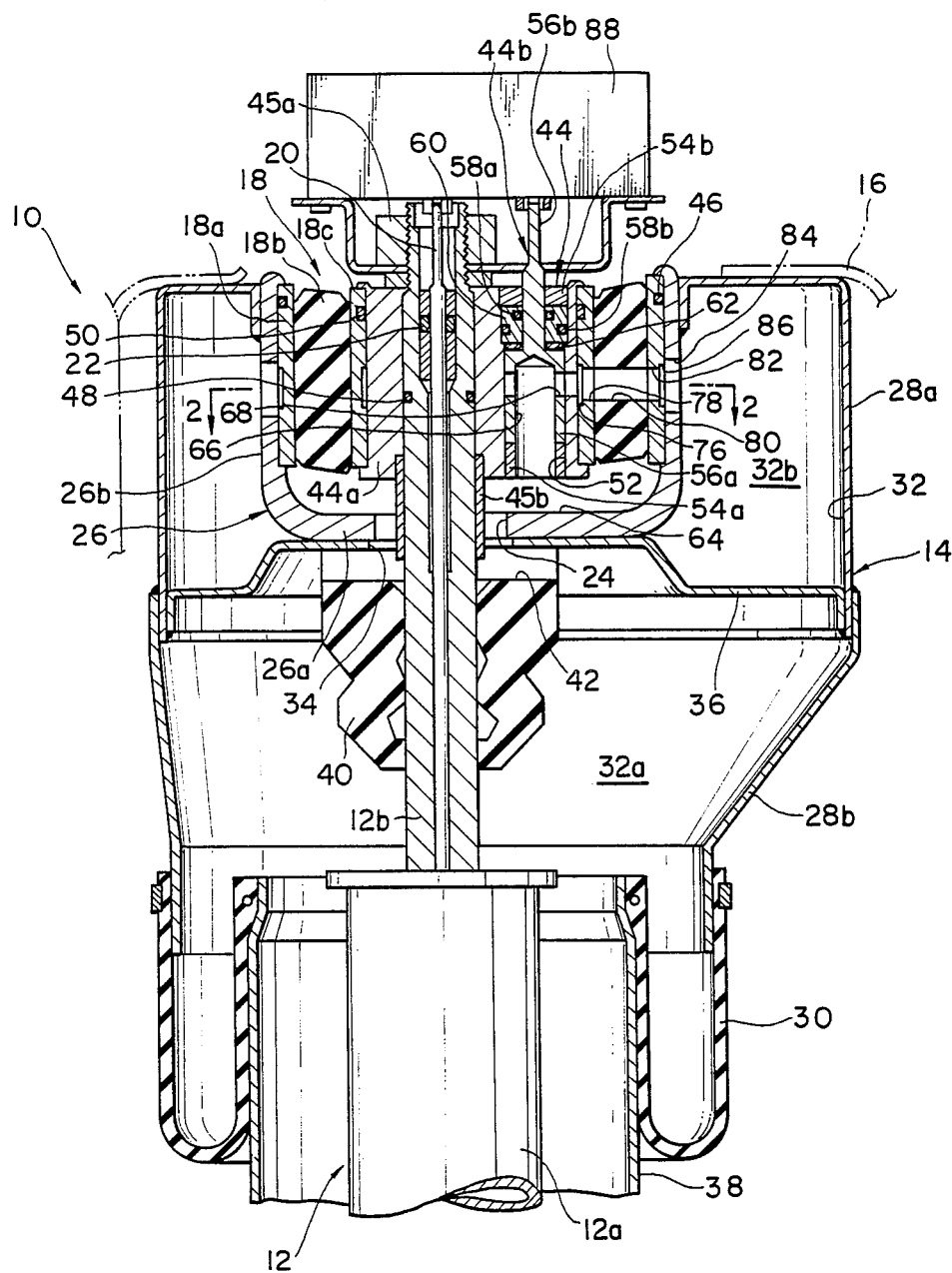
FIG. 1 is a longitudinal sectional view showing partially an air suspension according to the present invention.

An air suspension 10 according to the present invention, as shown in FIG. 1, comprises a well-known shock absorber 12 consisting of a cylinder, a piston and a piston rod and an air spring 14 provided in association with the shock absorber.

An axle (not shown) is supported on the lower end of the cylinder 12a of the shock absorber 12 and an elastic assembly 18 for elastically supporting the piston rod 12b on a car body 16 is provided on an upper end of the piston rod 12b extending from the piston (not shown) slidably disposed in the cylinder 12a. In an embodiment shown, the shock absorber 12 is a well-known variable damping force shock absorber which can regulate the damping force by operating a valve mechanism provided in said piston and a control rod 20 for regulating the damping force is disposed rotatably under the liquidtight condition in the piston rod 12b through a sealing member 22.

The air spring 14 has a chamber 32 defined by a peripheral wall member 26 provided with a bottom 26a having a penetration hole 24 through which the piston rod 12b extends and a peripheral wall portion 26b rising up from the edge of the bottom, an upper housing member 28a welded to the peripheral wall member 26 and disposed to cover the same and fixed to the car body 16 through bolts and nuts (not shown), a lower housing member 28b welded to a lower end of the upper housing member 28a and opened at a lower portion and a diaphragm 30 made of rubber attached respectively to the lower end of the lower housing member 28b and to an air piston 38 welded to the cylinder 12a.

The chamber 32 is divided into a lower main air chamber 32a and an upper auxiliary air chamber 32b by a partition wall member 36 fixed to said bottom 26a and the upper housing member 28a, both chambers 32a,32b being filled with compressed air. The partition wall member 36 has a penetration hole 34 corresponding to said penetration hole 24 provided in the bottom 26a of said peripheral wall member. The partition wall member 36 is provided with a well-known buffer rubber 40 capable of abutting against an upper end of the cylinder 12a and formed with a path 42 for affording communication between both penetration holes 24,34 and the main air chamber 32a.

Inside the peripheral wall member 26 defining the inner peripheral wall portion of the auxiliary air chamber 32b with the peripheral wall portion 26b is disposed said elastic assembly 18 to surround the piston rod 12b and provided with a valve unit 44 for controlling communication between both air chambers 32a, 32b.

Said elastic assembly 18 is provided with an outer tube 18a, a tubular rubber elastic member 18b and an inner tube 18c disposed concentrically with each other, the tubular elastic member 18b being bonded to both tubes 18a and 18c. The outer tube 18a of said elastic assembly 18 is press fitted into the peripheral wall portion 26b of said peripheral wall member 26 fixed to said car body through the upper housing member 28a. Also, into said inner tube 18c is press fitted a valve container 44a of said valve unit 44 permitting the penetration of the piston rod 12b. Since the piston rod 12b is fixed to said valve container 44a by a nut 45a and a holder 45b welded to the piston rod, the piston rod 12b is elastically supported on said car body through said elastic assembly 18. A clearance between the outer tube 18a and the peripheral wall portion 26b is sealed with an O-ring 46 and a clearance between the piston rod 12b and the valve container 44a is sealed with an O-ring 48. Also a clearance between the inner tube 18c and the valve container 44a is sealed with an O-ring 50.

Said valve container 44a has a penetration hole 52 extending parallel to the piston rod 12b and receiving rotatably a valve body 44b. The valve body is provided with a main body portion 56a against which a lower positioning ring 54a disposed on a lower end of said hole 52 abuts and a flat operating portion 56b projecting above said elastic assembly 18 from the body portion. On an upper end of said hole 52 is disposed an upper positioning ring 54b for preventing said valve body 44b from dropping out of the hole 52 in cooperation with the lower positioning ring 54a. Between the upper positioning ring 54b and the main body portion 56a is arranged an annular seal base 60 having an inner air seal member 58a and an outer air seal member 58b. Also, between the seal base 60 and the main body portion 56a of the valve body 44b is disposed an antifriction member 62 for smoothing the rotational movement of said valve body 44b when the main body portion 56a of said valve body is pressed against the seal base 60 by air pressure.

The elastic assembly 18 is formed on a lower portion with a chamber 64 communicating to the main air chamber 32a through said penetration holes 24,34 and a path 42 in the buffer rubber 40, and said main body portion 56a of said valve body is formed with a recess 66 opening to the chamber 64. Also, said main body portion 56a is formed with a path 68 penetrating the main body portion diametrally to cross said recess 66 and an air path is formed of the recess 66 and the path 68.

Figure 2:
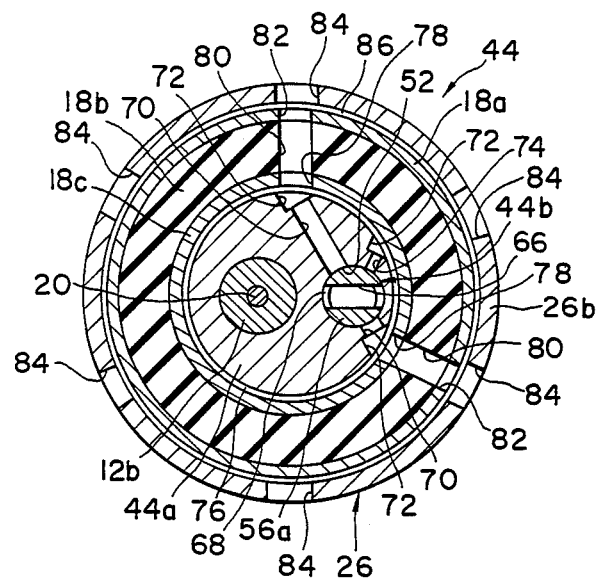
FIG. 2 is a sectional view showing a valve unit taken along the line 2—2 in FIG. 1.

As best shown in FIG. 2, the valve container 44a receiving said valve body 44b is provided with a pair of paths 70 having ends capable of communicating respectively to the path 68 of the valve body. A pair of the paths 70 extends diametrally outward of the hole 52 toward the outer peripheral surface of the valve container 44a on an approximately same horizontal plane and the other ends of the respective paths 70 open to the outer peripheral surface of the valve container 44a through enlarged holes 72. Also, between a pair of the paths 70 in the circumferential direction extends a path 74 having one end capable of communicating to the path 68 of the valve body toward said outer peripheral surface of the valve container 44a on the substantially same horizontal plane as said path 70. The diameter of the path 74 is smaller than that of the path 70 and the other end of the path 74 opens to said outer peripheral surface of the valve container 44a through the enlarged hole 72.

The inner tube 18c covering said outer peripheral surface of said valve container 44a is formed on an inner peripheral surface with an annular groove 76 surrounding said outer peripheral surface of the valve container 44a to afrod communication between said pairs of the paths 70 and path 74 through the respective holes 72, and this groove 76 is covered with the inner tube 18c to constitute an air path.

Said inner tube 18c has two penetration holes 78 opening to the annular air path defined by said groove 76, and said tubular elastic member 18b has penetration holes 80 extending radially outward of the elastic member and corresponding to said penetration holes 78. Also, the respective penetration holes 80 open to an outer peripheral surface of the outer tube 18a through penetration holes 82 provided in the outer tube 18a. Thus, said penetration holes 78,80 and 82 are provided corresponding to the paths 70 of said valve container and form an air path penetrating said elastic assembly 18.

To afford communication between the air path formed of said penetration holes 78,80 and 82 and said auxiliary air chamber 32b, the peripheral wall portion 26b of said peripheral wall member 26 is provided with a plurality of penetration holes 84 opening to said auxiliary air chamber 32b and spaced circumferentially equally from each other. To afford communication between all penetration holes 84 and the air path formed of said penetration holes 78,80 and 82, said outer tube 18a is formed on an outer peripheral surface with an annular groove 86 surrounding said outer tube in the opening portion of the penetration holes 82 and covered with the peripheral wall member 26 to form an annular air path to which said penetration hole 84 opens.

In an embodiment shown in FIG. 2, the penetration holes 78,80 and 82 constituting the air path in said elastic assembly are provided corresponding to two paths 70 in the valve container 44a. Between the inner tube 18c and the valve container 44a is formed said annular air path by the groove 76 covered with the inner tube 18c. Since paths 70,74 communicate to the penetration holes 78,80 and 82 of said elastic assembly 18 through said annular air path, the air paths corresponding to the enlarged holes 72 in the respective paths 70,74 do not need to be provided in said elastic assembly 18. For example as shown in the drawing, the air path corresponding to the path 74 can be dispensed with. In other words, at least one air path provided in said elastic assembly 18 will do. Since the number of the penetrating holes 80 provided in said tubular elastic member 18b can be reduced, the durability of said tubular elastic member 18b and said elastic assembly 18 including the elastic member can be improved.

By disposing said penetration hole 84 provided in the peripheral wall portion 26b of said peripheral member 26 corresponding to said air path in said elastic assembly 18, the groove 86 constituting the annular air path between said outer tube 18a and the peripheral wall member 26 can be dispensed with. However, by providing said groove 86, a plurality of the penetration holes 84 more than air paths in said elastic assembly can be provided so that all penetration holes can communicate to the air path in said elastic assembly and thereby ventilating sounds can be reduced by the dispersion of air flow. Thus, the embodiment shown in the drawing is desirable in view of a measure to reduce noises.

In place of providing the groove 76 in the inner tube member 18c, a similar groove may be provided on the outer peripheral surface of the valve container 44a to define the annular air path or grooves may be provided on both member and surface to constitute an annular air path similar to the said one in cooperation with both grooves.

Figure 3:
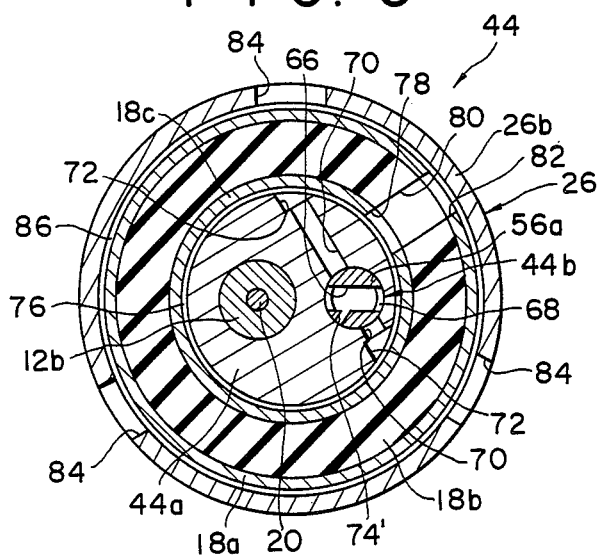
FIG. 3 is a sectional view similar to that in FIG. 2, showing another embodiment of the valve unit.

Also, in place of providing the small diameter communicating path 74 in said valve container 44a, as shown in FIG. 3, a branch path 74' having the diameter smaller than that of the path 68 in the valve body 44b may be provided in said path 66. While in the valve unit 44 provided with said branch path 74' the penetration holes 78,80 and 82 in said elastic assembly 18 are provided in positions deviated from the enlarged hole 72 in the path 70 of the valve container 44a, said holes 78,80 and 82 communicate to said path 70 through the air path constituted by the annular groove 76 similar to said one.

Again referred to FIG. 1, on the upper end of the piston rod 12b is provided a well-known actuator unit 88 consisting of a motor and a reduction gear to rotatably operate the control rod 20 and the valve body 44b of said valve unit 44 for regulating the damping force of the shock absorber 12 and the spring constant of the air spring 14. The operative portion 55b of the valve body 44b and an end of the control rod 20 are inserted respectively into two shafts of the operative unit 88 so that said valve body 44b and the control rod 20 are operatively rotated.

When said valve body 44b is held in the closed position as shown in FIG. 2, i.e., the position where the path 68 in said valve body does not communicate to any of the path 70 and 74 in said valve container, communication between the main air chamber 32a and the auxiliary air chamber 32b is interrupted and only the main air chamber 32a is subjected to the spring action, thereby the spring constant of said suspension 10 has a large value.

When the path 68 in said valve body is operated to the position where it communicates to the larger diameter path 70 in said valve container, the main air chamber 32a communicates to the auxiliary air chamber 32b through the air path consisting of said path 68, the larger diameter path 70 and the groove 76, the air path consisting of the penetration holes 78,80 and 82 in said elastic assembly 18 and the penetration hole 84. Since the main and auxiliary air chambers are subjected to the spring action, the spring constant of said suspension 10 has a small value.

When the path 68 in said valve body is operated to the position where it communicates to the smaller diameter path 74 in said valve container, the main air chamber 32a communicates to the auxiliary air chamber 32b through said path 68, the air path consisting of the smaller diameter path 74 and said groove 76, the air path consisting of the penetration holes 78,80 and 82 in said elastic assembly 18 and the penetration hole 84. Since said smaller diameter path 74 gives larger air resistance compared with that of the larger diameter one 70, the spring constant of said suspension 10 has an intermediate value.

Said valve body 44b is preferably operated such that the spring constant of the air spring 14 is increased or decreased in response to the increase or decrease of the damping force of said shock absorber 12 due to the rotation of the control rod 20.

In the embodiment shown in FIG. 3, the spring constant of said suspension 10 has a large value in the closed position shown in FIG. 3 where both said path 68 and the branch path 74' in the valve body 44b do not communicate to the path 70 in the valve container 44a, and said spring constant has a small value where said path 68 communicates to the path 70 and an intermediate value where said branch path 74' communicates to the path 70.

What is claimed is:

1. An air suspension capable of varying the spring constant by controlling communication between a main air chamber and an auxiliary air chamber provided in association with a shock absorber including a cylinder, a piston and a piston rod, comprising:

a peripheral wall member defining a wall portion of one of said air chambers and having one or a plurality of first air paths penetrating from an inner peripheral surface to an outer peripheral surface to open to said one air chamber;

a tubular elastic member disposed inside said peripheral wall member and having one or a plurality of second air paths penetrating from an inner peripheral surface to an outer peripheral surface of said tubular elastic member to communicate to said first air path;

a valve container disposed inside said tubular elastic member and coupled to said piston rod and having a valve containing section, one or a plurality of third air paths penetrating from said valve containing section to an outer peripheral surface of said valve container, and a fourth air path provided circumferentially on the outer peripheral surface of said valve container and communicating to said second and third air paths respectively; and a valve body disposed in said valve containing section of said valve container and having a fifth air path communicating to the other one of said two air chambers, and one or a plurality of sixth air paths penetrating from said fifth air path to an outer peripheral surface of said valve body and being able to communicate to said third air path.

2. An air suspension as claimed in claim 1, wherein the number of said second air paths in said tubular elastic member is smaller than that of said third air paths in said valve container.

3. An air suspension as claimed in claim 1, wherein an outer tube is disposed between said peripheral wall member and said tubular elastic member, said outer tube having one or a plurality of seventh air paths penetrating from an inner peripheral surface to an outer peripheral surface of said outer tube to communicate to said first and second air paths respectively.

4. An air suspension as claimed in claim 3, wherein either one of said peripheral wall member or said outer tube has an eighth air path extending circumferentially and communicating to said first and seventh air paths respectively.

5. An air suspension as claimed in claim 4, wherein the number of said first air paths in said peripheral wall member is larger than that of said seventh air paths in said outer tube.

6. An air suspension as claimed in claim 1, wherein said third air path in said valve container includes at least one path portion and at least one path portion with a bore smaller than that of said path portion.

7. An air suspension as claimed in claim 1, wherein said third air path in said valve container includes two path portions with same-sized bore, said fifth air path in said valve body consists of a recess, and said sixth air path in said valve body includes at least one path portion and at least one path portion with a bore smaller than that of said path portion.

8. An air suspension as claimed in claim 1, wherein said fourth air path in said valve container extends annularly.

9. An air suspension capable of varying the spring constant by controlling communication between a main air chamber and an auxiliary air chamber provided in association with a shock absorber including a cylinder, a piston and a piston rod, comprising:

a peripheral wall member defining a wall portion of one of said air chambers and having one or a plurality of first air paths penetrating from an inner peripheral surface to an outer peripheral surface to open to said one air chamber;

a tubular elastic member disposed inside said peripheral wall member and having one or a plurality of second air paths penetrating from an inner peripheral surface to an outer peripheral surface of said tubular elastic member to communicate to said first air path;

an inner tube disposed inside said tubular elastic member and having one or a plurality of third air paths penetrating from an inner peripheral surface to an outer peripheral surface of said inner tubes to communicate to said second air path;

a valve container disposed inside said inner tube and coupled to said piston rod and having a valve containing section, and one or a plurality of fourth air paths penetrating from said valve containing section to an outer peripheral surface of said valve container;

a valve body disposed in said valve containing section of said valve container and having a fifth air path communicating to the other one of said two air chambers, and one or a plurality of sixth air paths penetrating from said fifth air path to an outer peripheral surface of said valve body and being able to communicate to said fourth air path; and either one of said inner tube or said valve container having a seventh air path extending circumferentially and communicating to said third and fourth air paths respectively.

10. An air suspension capable of varying the spring constant by controlling communication between a main air chamber and an auxiliary air chamber provided in association with a shock absorber including a cylinder, a piston and a piston rod, comprising:

a peripheral wall member defining a wall portion of one of said air chambers and having one or a plurality of first air paths penetrating from an inner peripheral surface to an outer peripheral surface to open to said one air chamber;

an outer tube disposed inside said peripheral wall member and having one or a plurality of second air paths penetrating from an inner peripheral surface to an outer peripheral surface of said outer tube to communicate to said first air path;

a tubular elastic member disposed inside said outer tube and having one or a plurality of third air paths penetrating from, an inner peripheral surface to an outer peripheral surface of said tubular elastic member to communicate to said second air path;

an inner tube disposed inside said tubular elastic member and having one or a plurality of fourth air paths penetrating from an inner peripheral surface to an outer peripheral surface of said inner tube to communicate to said third air path;

a valve container disposed inside said inner tube and coupled to said piston rod and having a valve containing section, and one or a plurality of fifth air paths penetrating from said valve containing section to an outer peripheral surface of said valve container;

a valve body disposed in said valve container section of said valve housing and having a sixth air path communicating to the other one of said two air chambers, and one or a plurality of seventh air paths penetrating from said sixth air path to an outer peripheral surface of said valve body and being able to communicate to said fifth air path;

either one of said peripheral wall member or said outer tube having an eighth air path extending circumferentially and communicating to said first and second air paths respectively; and either one of said inner tube or said valve container having a ninth air path extending circumferentially and communicating to said fourth and fifth air path respectively.

* * * * *